United States
Decorato

[11] 3,944,345
[45] Mar. 16, 1976

[54] OPTICALLY CORRECTED SWIMMING GOGGLES

[76] Inventor: Frank Decorato, 60 E. 96th St., New York, N.Y. 10028

[22] Filed: June 6, 1974

[21] Appl. No.: 476,970

[52] U.S. Cl. .................. 351/43; 2/14 G; 2/14 L; 350/179; 351/57
[51] Int. Cl.² ........................................... G02C 1/00
[58] Field of Search ............ 351/43, 57, 58, 47, 48; 2/14 G, 14 L; 350/179, 248, 319, 72

[56] References Cited
UNITED STATES PATENTS

| | | | |
|---|---|---|---|
| 1,587,131 | 6/1926 | Tillyer | 2/14 G |
| 1,742,412 | 1/1930 | O'Flanagan | 351/43 X |
| 2,928,097 | 3/1960 | Neufeld | 351/43 X |

*Primary Examiner*—Paul A. Sacher
*Attorney, Agent, or Firm*—Behr & Woodbridge

[57] ABSTRACT

A novel type of swimming goggles includes an improved means for receiving corrective lenses. The corrective lens forms the outermost face of the goggles and is easily insertable. The novel swimming goggles of this invention are inexpensive to manufacture. The lateral vision of the swimmer is improved due to the transparent sidewall construction of the goggles. A resilient gasket between the goggle socket and the face of the swimmer allows for a watertight seal therebetween.

5 Claims, 7 Drawing Figures

OPTICALLY CORRECTED SWIMMING GOGGLES

BACKGROUND OF THE INVENTION

1. Field of the Invention

This invention concerns an improved type of goggles. In particular, the invention is directed towards an improved swimming goggle with novel means for receiving corrective lenses.

2. Background of the Invention

Examples of underwater diving goggles incorporating corrective lenses can be found in certain parts of the prior art. See, for example, Neufeld U.S. Pat. No. 2,928,097; Pepke U.S. Pat. No. 3,320,018 and Hagen U.S. Pat. No. 3,672,750. The foregoing patents disclose optically corrected underwater goggles and further inclue features which allow the diver greater lateral or sideways vision. The improved lateral vision of the prior art is achieved by rounding the face plate of the diving mask to completely encircle the diver's field of vision. Such an approach can be very expensive because it required precise, optically correct plastic molding. While the diving masks disclosed by Neufeld, Pepke and Hagen are satisfactory, they are nevertheless expensive to construct and difficult to manufacture.

Typical prior art diving goggles in which the eye sockets are separated are disclosed in the patents to O'Flannagan U.S. Pat. No. 1,742,412 and Welsh U.S. Pat. No. 2,317,658. Welsh is of particular interest because it discloses the use of two clear windows per eye socket. The purpose of the dual window feature is to reduce fogging due to temperature differentials.

Of course, protective safety goggles have been used for industrial and commercial purposes for a number of years. Typical of such eye protecting goggles are: Kimball U.S. Pat. No. 2,195,175, Nelson U.S. Pat. No. 3,147,489 and O'Shea U.S. Pat. No. 3,533,686. In particular, Nelson discloses in FIGS. 6 and 7 thereof a composite safety goggle including a plurality of clear or tinted windows and lenses. While safety goggles have been known for a long time, they are nevertheless expensive and unsuitable for swimming goggles due to the fact that they are rarely airtight. As a matter of fact, many goggles include side vents for the purpose of allowing ventilation. See, for instance, Kimball, FIG. 1, element 26.

A pair of ski goggles having a tilted face plate is disclosed in the patent to Young U.S. Pat. No. 3,036,310. Tilting the face plate of ski goggles and the like helps to decrease their aerodynamic resistance and may be desirable for other reasons. However, the use of a tilted face plate to facilitate backstroking by a swimmer appears to be a technique unknown in the prior art.

The following prior art patents are typical of the general state of development of the underwater goggles art: Grano U.S. Pat. No. 2,088,262; Monahan, Jr. et al. U.S. Pat. No. 2,993,209; Simpson U.S. Pat. No. 3,040,616; Chan U.S. Pat. No. 3,051,957 and Andresen, Jr. U.S. Pat. No. 3,055,256. Judging from the state of the goggles art as exemplified by the foregoing patents, there does not appear to be disclosed anywhere the use of corrective lenses in a pair of swimming goggles, as opposed to the use of corrective lenses in underwater diving masks. For a variety of reasons, it is generally undesirable for a swimmer to use a full face mask when simply swimming on the surface of the water. On the other hand, simple swimming goggles are unuseable by divers because there is no means for compensating for changes in pressure. Therefore, the swimming goggles of the present invention were invented as a result of the fact that inexpensive swimming goggles incorporating corrective lenses were not available on the general market. In particular, inexpensive swimming goggles incorporating a tilted face plate and side vision facilities were not available either. It was in the context of the foregoing necessities that the present invention was made, a summary of which follows.

SUMMARY OF THE INVENTION

Briefly, the present invention consists of a pair of swimming goggles having the means for readily receiving corrective lens. The corrective lens is mounted so that the water impinges upon it before it might impinge upon any subsequent window in the goggles. Standard ophthalmically ground and commercially available lenses may be easily snapped into place in the goggles. The goggles are typically made of a clear plastic of the sort available commercially. The front lens may be tilted at an angle to the line of sight of the swimmer so that the swimmer can see correctly backwards while doing the backstroke. By forming the goggles structure from clear plastic it is possible for the swimmer to see objects on either side of him. It is a principle advantage of the present invention that such goggles could be made inexpensively and that they could be fitted with corrective lenses with an absolute minimum of effort. The foregoing goggles may be used with or without a clear plastic window between the corrective lens and the eye of the swimmer. The advantages of this invention will be more readily understood with reference to the following drawings.

DESCRIPTION OF THE INVENTION

During the course of this disclosure, it will be appreciated that like numbers refer to like elements in the different drawings.

Figure 1:
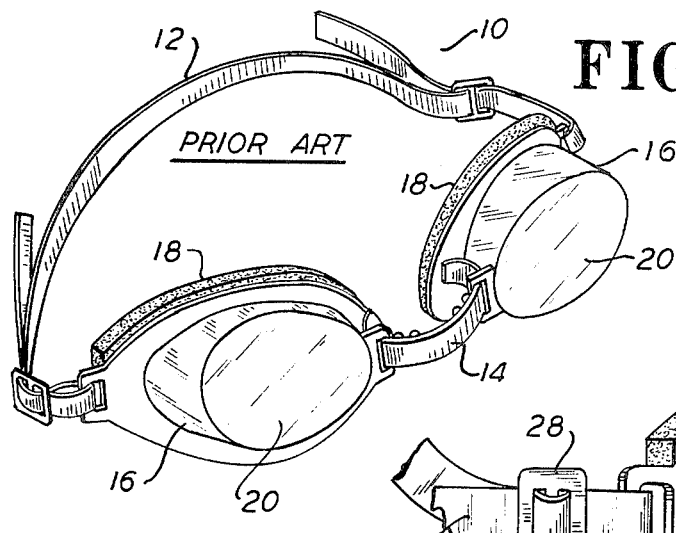
FIG. 1 illustrates a typical pair of prior art swimming goggles.

A typical pair of prior art swimming goggles is illustrated in FIG. 1. The prior art goggles 10 of FIG. 1 include a elastic headband 12, a resilient nose bridge strap 14 and a pair of eye sockets 16. The base of the eye socket 16 is typically surrounded at the periphery thereof with a resilient gasket material 18. The gasket material serves to form a watertight seal between the socket element 16 and the face of the swimmer. The front of each goggle socket includes a clear plastic window 20. Typically, the socket 16 and the window 20 are formed from clear plastic, however the window element 20 may be made of a tinted material if it is desired to reduce harmful sun glare. The plastic used in the frame of the sockets 16 is generally a hard plastic which may be readily molded to the generally contour of the swimmer's face. Swimming goggles are relatively inexpensive to manufacture. Unfortunately, if the swimmer requires corrective lenses, he must often resort to diving masks, because swimming goggles adaptable to receive corrective lenses do not appear to be readily available to the swimmer of modest means. Though diving masks including corrective lenses are suitable for certain applications, they are nevertheless expensive and frequently difficult to have fitted with the correct lenses.

In response to the lack of generally available, inexpensive swimming goggles, the device illustrated as FIG. 2–6 was invented.

Figure 2A:
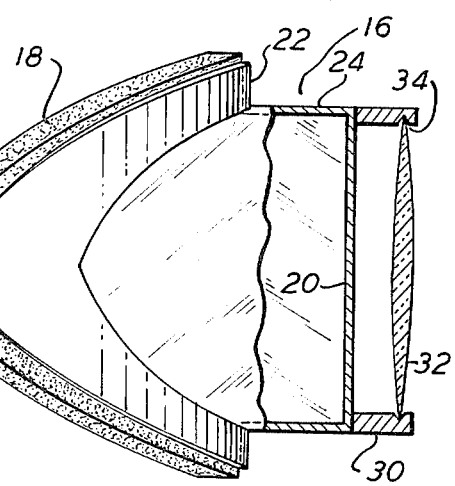
FIG. 2a is a partial cross-sectional view of the swimming goggles of the invention.
Figure 2B:
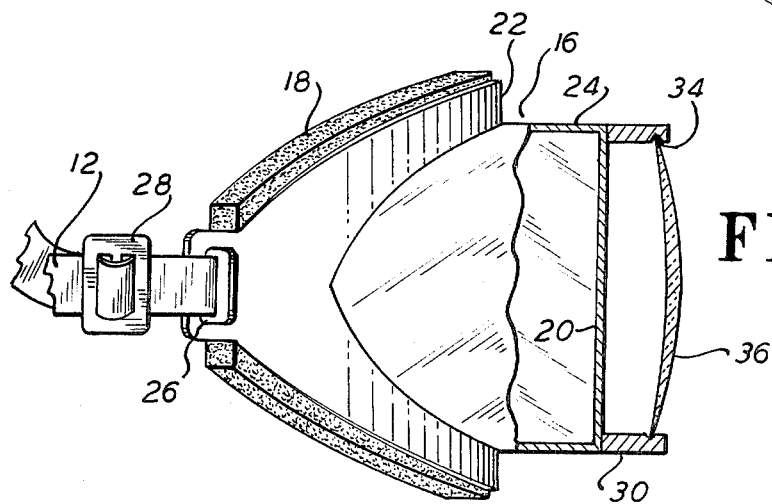
FIG. 2b is a partial cross-sectional view of the present invention wherein the lens member is convex.

The present invention according to a preferred embodiment is shown in cross-sectional perspective in FIG. 2a. The socket 16 is shown to include, according to this view, a peripheral flange section 22 which surrounds the base of the socket. Flange section 22 is perpendicular to sidewall section 24 of the socket 16. A window 20 is mounted on the sidewall 24 in a manner previously discussed with reference to FIG. 1. The resilient gasket 18 is typically suggestive of an oval in shape and is approximately 2½ inches long in its longest dimension. The material is typically soft neoprene or neoprene airfoam or rubber with a thickness of approximately ¼ inch. The elastic headband 12 typically comprises a rubber strap having a length of 16 inches, a width of ¼ inch and a thickness of 1/16 inch. The headband 12 is anchored to the flange 22 of socket 16 through a receiving hole 26. The tightness of elastic 12 may be adjusted with buckle 28 in a conventional manner. The nose bridge strap 14, which is not seen in the views of FIGS. 2–6, is typically a piece of rubber or plastic 1½ inches long by ¼ inch wide. Frequently notches in the plastic are used to adjust for varying widths across the bridge of the nose of the swimmer.

According to the present invention, the goggles shown in FIG. 2a include a circular extension or rim 30 which receives corrective lens 32 in a snap-in fashion. The extension 30 is connected in a waterproof fashion, either to the periphery of the window 20 or to the edge of the sidewall section 24. The sidewall and the flange may be made from glass or from a plastic such as an acrylic. The extension 30 may also be plastic but should be pliable so as to receive the corrective lens 32. Therefore the material of the extension 30 may be either a soft plastic or a plastic which deforms slightly under the influence of heat or pressure. Likewise, of course, window 20 may be either glass or plastic too.

According to the present invention the distance between the eye of the swimmer and the corrective lens is on the order of approximately 1 inch and the width of the goggles socket 16 is approximately 1½ inches. The closest distance from the window 20 to the flange section 22 is approximately ⅜ inch and from there the extension 30 protrudes from 3/16 to 5/16 of an inch outward. A lens receiving groove 34 is set back approximately 1 millimeter from the leading edge of extension 30. Groove 34 circumscribes the interior periphery of extension 30 and forms a watertight seal with the perimiter of corrective lens 32. Extension 30 can be from 2 to 9 millimeters thick and the groove therein is typically 1 to 2 millimeters in width across the interior surface of the extension 30 and from ¼ to ½ millimeters in depth measured from the interior surface of the extension 30 to the tip of the interior apex of the groove 34. The 1 millimeter inset of the groove with respect to the leading edge of extension 30 is measured to the beginning of the base of the groove and not to its apex.

Because extension 30 is made from a pliable material it is relatively easy to snap a conventional type of lens into the groove 34. As discussed above, the pliability of the extension 30 may be induced by heat in a manner familiar to those of ordinary skill in the corrective lens art. If, for some reason, the corrective lens does not form a watertight fit within the groove 34, the peripheral groove can be sealed with any one of a variety of well known clear transparent cements. A clear epoxy cement would be satisfactory under many circumstances. It will be appreciated that, because the lens is mounted near the outside of the mark, access to the lens receiving means is relatively simple. Therefore, it is not difficult for the owner of such a device to take the goggles to a trained optometrist and have him order a pair of conventional corrective lenses for these goggles. Since a swimmer spends as much time above the surface as he does looking beneath the surface of the water, it is not necessary that the corrective lenses compensate for the distortion in magnification frequently associated with diving goggles. In other words, the owner of such a pair of goggles merely has to go to his optometrist and have him order a pair of suitable prescription lenses. Since lenses come in a wide variety of shapes, it is not difficult to have lenses ground which would readily be receivable within the lense groove 34 of the goggles of the instant invention.

The water goggles of the present invention are constructed so as to be able to receive a wide variety of lenses. According to FIG. 2b, lens 36 is shown as being a convex lens. According to FIG. 2a, previously discussed, the lens 32 is shown as being relatively planer in shape. It is also possible, therefore, to employ lenses that are concave or a combination of both, such as in the case of bi-focals.

Figure 3:
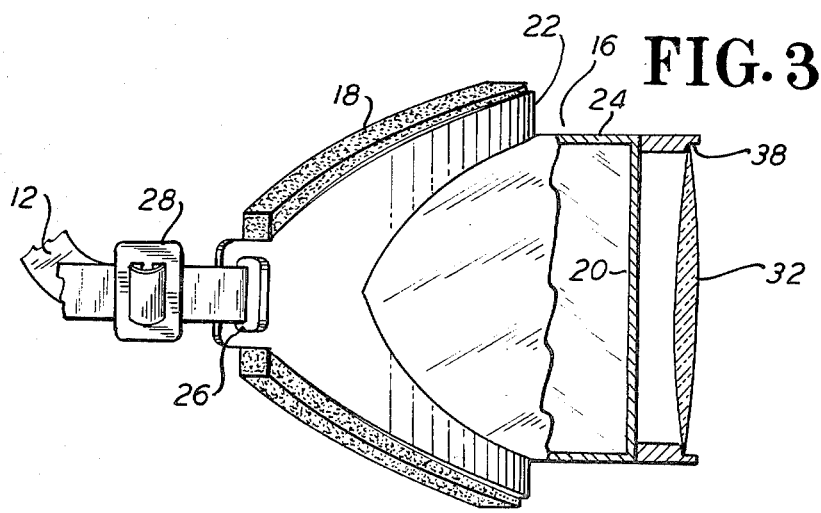
FIG. 3 is a partial cross-sectional view of the present invention wherein the lens member is received on a ledge.

In FIG. 3 the lens receiving means is shown to be a ledge 38. Peripheral ledge 38 extends entirely around the circumference of the extension 30. The advantage of a ledge such as element 38 is that it is easier to place the lens 32 in position. However, it is also necessary to cement the lens 32 in place, otherwise it will fall out. Likewise, the use of a ledge such as 38 instead of a groove such as 34, may create water leakage problems. Therefore, the use of a groove is preferred over the use of a simple edge-like lens receiving means.

Figure 4:
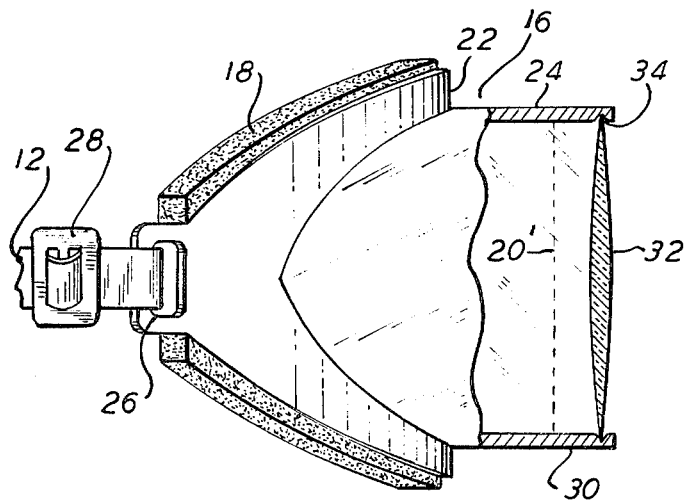
FIG. 4 is a partial cross-sectional view of the present invention in which there is no clear plastic window between the swimmer's eye and the corrective lens.

Under some circumstances, it may be desirable to eliminate window 20. A goggle with the window 20 eliminated is shown in FIG. 4. The location where the window 20 would be normally found is indicated in phantom line as 20'. By eliminating window 20 it is possible to cut down on the cost of producing such goggles. However, window 20 serves several useful function. One function is to preserve an air gap between the lens 32 and the window 20 whereby water leaks would not reach the eye. Also, it is known in the prior art to form a dead space between the windows of the goggles in order to reduce the tendancy to cause fogging. Further, the use of an additional window adds a little bit of extra strength to the socket element 16.

Figure 5A:
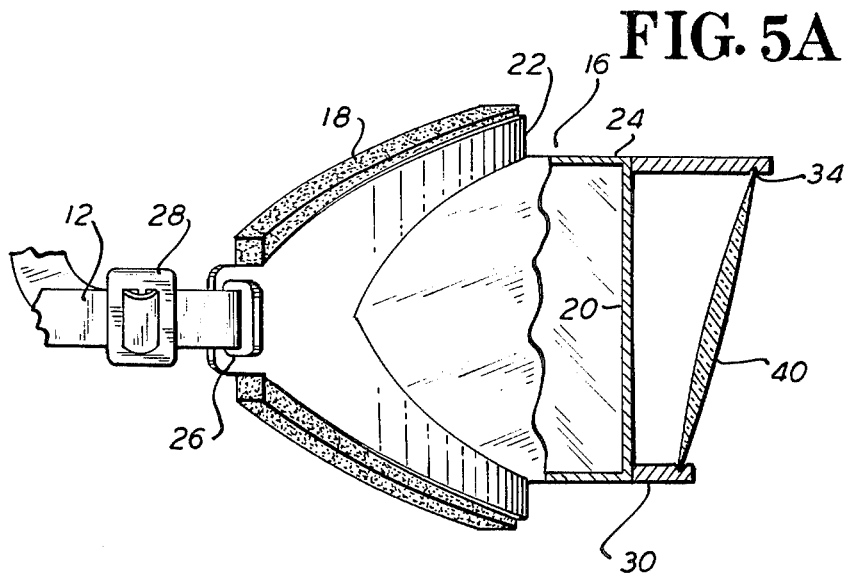
FIG. 5a is a partial cross-sectional view of the present invention wherein the corrective lens is tilted with respect to the normal plane of vision of the swimmer.

Another embodiment of the present invention is shown in FIG. 5a. The goggles illustrated therein include a tilted corrective lens 40. The lens 40 is tilted so that a swimmer doing the backstroke may have a better view of his progress. In order to achieve the tilting of lens 40 it is necessary to extend the upper part of extension 30 beyond the lower part thereof. Under such circumstances, it may also be desirable to tilt or cant the groove 34 so that lens 40 is readily received therein. The angle of tilt of lens 40 may typically be between five to sixty degrees with respect to the plane of the window 20. The plane of the window 20 is perpendicular to the normal line of sight of the swimmer and also generally perpendicular to the plane of the sidewall 24. The tilting of lens 40 also adds to the aerodynamic streamlined shape of the goggles and further has the advantage that water drops may tend to drip directly from the upper part of the extension 30 without rolling across the face of the lens 40.

Figure 5B:
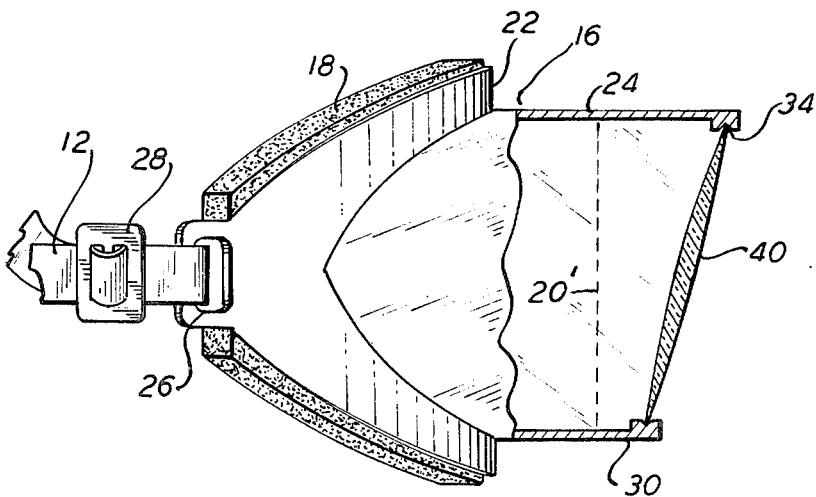
FIG. 5b is a partial cross-sectional view of the goggles illustrated in FIG. 5a, but wherein the clear transparent window has been eliminated.

A modified version of the embodiment of FIG. 5a is shown in FIG. 5b, wherein the window 20 has been eliminated in a manner similar to that of the goggles illustrated in FIG. 4.

While the invention has been particularly shown and described with reference to a preferred embodiment thereof, it will be understood by those skilled in the art that various changes in form and detail may be made therein without departing from the spirit and scope of the invention.

I claim:

1. An improved pair of swimming goggles for use by a swimmer including:
   a pair of plastic eye sockets, each socket including a flange base section roughly shaped to fit the contour of a swimmer's eye, a sidewall section connected to said flange base section and extending outward therefrom roughly parallel to the direction to the line of sight of said swimmer, and a transparent sidewall extension extending from said sidewall section;
   a nose strap for connecting said sockets over the bridge of the nose of said swimmer;
   a head strap for connecting said sockets one to the other around the back of the head of said swimmer, said head strap, sockets and nose strap thereby forming a continuous loop when connected together;
   a lens receiving means located in said transparent sidewall extension, said lens receiving means comprising a snap-in groove adapted to receive a corrective lens therein; and
   a transparent window connected to said sidewall section and located intermediate the base flange section and said lens receiving means.

2. The invention of claim 1 wherein the plane of said corrective lens is tilted at an angle of between 5° and 60° relative to a line perpendicular to the normal line of sight of a swimmer wearing said goggles.

3. The invention of claim 1 wherein said sidewall section and said sidewall extension are a continuous piece of plastic material.

4. The invention of claim 1 wherein said sidewall extension and said sidewall and discreet plastic elements connected together by a cement-type material.

5. An improved pair of swimming goggles for use by a swimmer including:
   a pair of plastic eye sockets, each socket including a flange base section roughly shaped to fit the contour of a swimmer's eye, a sidewall section connected to said flange base section and extending outwardly therefrom roughly parallel to the direction of the line of sight of said swimmer, and a transparent sidewall extension extending from said sidewall section;
   a nose strap for connecting said sockets over the bridge of the nose of said swimmer;
   a head strap for connecting said sockets one to the other around the back of the head of said swimmer, said head strap, sockets and nose strap thereby forming a continuous loop when connected together;
   a lens receiving means located in said transparent sidewall extension and comprising a flat ledge recessed into said sidewall extension and adapted to receive said corrective lens, said corrective lens being securable into said sidewall extension by a cement-type material; and,
   a transparent window connected to said sidewall section and located intermediate the base flange section and said lens receiving means.

* * * * *